US006798628B1

(12) United States Patent
Macbeth

(10) Patent No.: US 6,798,628 B1
(45) Date of Patent: Sep. 28, 2004

(54) ARC FAULT CIRCUIT DETECTOR HAVING TWO ARC FAULT DETECTION LEVELS

(75) Inventor: Bruce F. Macbeth, Syracuse, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 306 days.

(21) Appl. No.: 09/990,809

(22) Filed: Nov. 16, 2001

Related U.S. Application Data

(60) Provisional application No. 60/249,480, filed on Nov. 17, 2000.

(51) Int. Cl.[7] .............................................. H02H 3/00
(52) U.S. Cl. ....................................................... 361/42
(58) Field of Search ...................... 361/42–50; 324/520, 324/522, 536, 613; 702/58, 64–66, 69–76

(56) References Cited

U.S. PATENT DOCUMENTS

| | | | | |
|---|---|---|---|---|
| 5,729,145 A | * | 3/1998 | Blades ......................... 324/536 |
| 5,835,321 A | * | 11/1998 | Elms et al. .................... 361/45 |
| 6,362,628 B2 | * | 3/2002 | Macbeth et al. ............. 324/536 |
| 6,373,257 B1 | * | 4/2002 | Macbeth et al. ............. 324/536 |
| 6,414,829 B1 | * | 7/2002 | Haun et al. .................... 361/42 |
| 6,421,214 B1 | * | 7/2002 | Packard et al. ................. 361/7 |
| 6,433,978 B1 | * | 8/2002 | Neiger et al. ................. 361/42 |
| 6,477,021 B1 | * | 11/2002 | Haun et al. .................... 361/42 |
| 6,625,550 B1 | * | 9/2003 | Scott et al. .................... 702/58 |

* cited by examiner

*Primary Examiner*—Ronald Leja
(74) *Attorney, Agent, or Firm*—Daniel P. Malley

(57) ABSTRACT

An arc fault protection device uses two detection levels for detecting both parallel and series arc faults. When a sensed load current is below a predetermined level, a first set of characteristics indicative of a series arc fault are compared to a sensed di/dt signal. When the sensed load current exceeds the predetermined level, a second set of characteristics indicative of a parallel arc fault are compared to the sensed di/dt signal. This approach allows more time to evaluate a potential series arc fault than is permitted when evaluating a potential parallel arc fault.

41 Claims, 1 Drawing Sheet

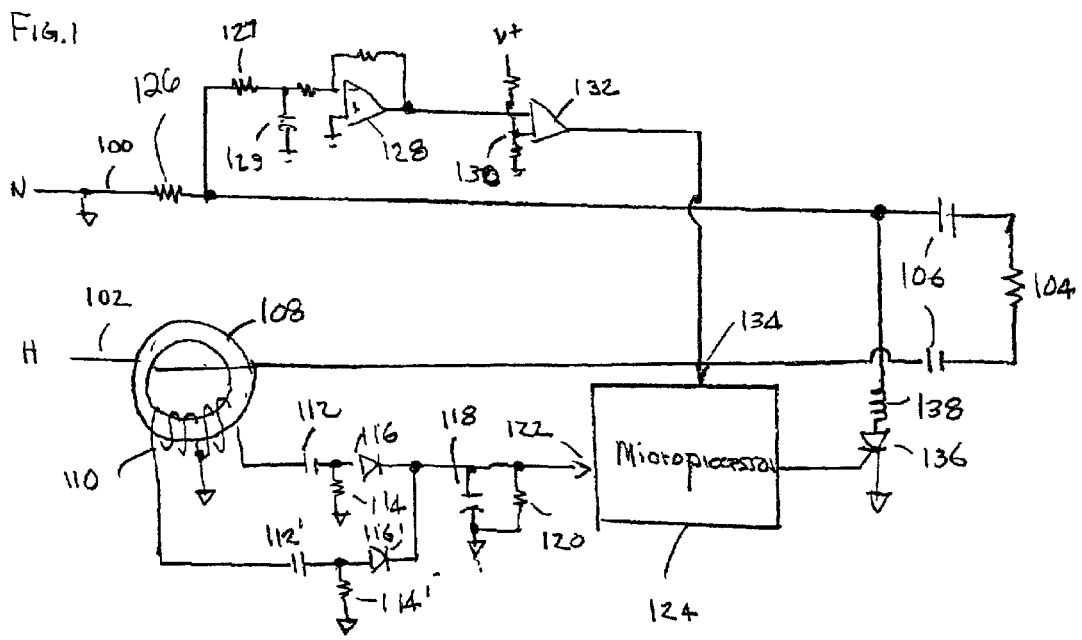

ARC FAULT CIRCUIT DETECTOR HAVING TWO ARC FAULT DETECTION LEVELS

CROSS-REFERENCE TO RELATED APPLICATIONS

This application claims priority from U.S. Provisional Application Ser. No. 60/249,480 filed Nov. 17, 2000 and entitled ARC FAULT CIRCUIT DETECTOR HAVING TWO ARC FAULT DETECTION LEVELS, incorporated herein by reference.

FIELD OF THE INVENTION

This invention relates generally to the field of arc fault detectors, and more particularly to an arc fault detector with two arc fault detection levels for detecting both series and parallel arc faults.

BACKGROUND OF THE INVENTION

Underwriters Laboratories requirements for certain types of arc fault circuit interrupters (AFCI), namely combination devices, as defined in their standard 1699, requires the device to sense a wide range of arcing conditions, so as to interrupt the flow of electrical current before the arcing condition causes flammable ignition of nearby combustibles. Included in these conditions are what have commonly been termed "A-type" faults in which the arc occurs across a break in the line or neutral conductors or at a loose terminal in a branch circuit of a distribution network, where the conductors are carrying current to a load. The arc could likewise occur as a break or at a loose terminal associated with an extension cord deriving power from line voltage, completing the circuit to the load. Since the current through the "A-type" fault is limited by the impedance of the load itself, because the fault is in series with the load, an A-type fault is also known as a series fault. The combination outlet device must detect series faults in which the load is as low as 5 amperes, which has been determined by UL to be the lowest current where fire is likely to occur. The highest series arc fault current slightly exceeds the rating of the upstream overcurrent device (fuse or circuit breaker) required by code to protect the branch circuit, established by UL to be 30 amperes.

"B-type" faults are a second arcing condition that must be detected and interrupted by a combination outlet device. In a B-type fault, the arc occurs across two conductors in the branch circuit or extension cords plugged into it at a site where the insulating media separating the two conductors has been compromised. The arc may occur across the line and neutral conductors or the line and ground conductors, or in the case of reverse polarity where the line voltage is reverse-polarized, between the neutral and ground conductors. The current through the B-type fault is not limited by the impedance of the load, but by the available current from the supply established by the impedance of the conductors and terminals between the source of line voltage and the position of the parallel fault, i.e., by the conductive members carrying the fault current. Since B-type faults are effectively across the line, they are also known as parallel faults. The combination arc fault circuit interrupter outlet device must detect parallel arc faults in which the available current to the parallel fault is as high as 500 amperes, above which the overcurrent device (fuse or circuit breaker) affords protection.

Considering both series and parallel arc faults, the combination outlet AFCI must be able to cover a range of fault currents from 5 amperes to 500 amperes. The test methodologies in the UL standard for generating series and parallel arc faults differ in order to establish the two different types of faults. The standard allows for a longer interrupting time of the AFCI for lower energy arcs (series) than for higher energy arcs (parallel) without sacrificing the protective benefit or risking ignition of nearby combustibles.

SUMMARY OF THE INVENTION

Briefly stated, an arc fault protection device uses two detection levels for detecting both parallel and series arc faults. When a sensed load current is below a predetermined level, a first set of characteristics indicative of a series arc fault are compared to a sensed di/dt signal. When the sensed load current exceeds the predetermined level, a second set of characteristics indicative of a parallel arc fault are compared to the sensed di/dt signal. This approach allows more time to evaluate a potential series arc fault than is permitted when evaluating a potential parallel arc fault.

According to an embodiment of the invention, an arc fault protection device protective of an electrical distribution system having a load includes a sensor for sensing arc fault signatures in the presence of unwanted arc fault mimicking noise; a load current threshold detector, and first and second filters for distinguishing arc fault signatures from the unwanted arc mimicking noise having first and second sets of characteristics, respectively; wherein the first filter is enabled if a load current is below the load current threshold, and the second filter is enabled if the load current is above the load current threshold.

According to an embodiment of the invention, an arc fault protection device protective of an electrical distribution system having a load includes a sensor for sensing arc fault signatures in the presence of unwanted arc fault mimicking noise; a load current threshold detector; and first and second filters for distinguishing arc fault signatures from the unwanted arc mimicking noise having first and second sets of characteristics, respectively; wherein the first filter is enabled if a load current is below the load current threshold, and the first and second filters are enabled if the load current is above the load current threshold.

According to an embodiment of the invention, an arc fault protection device protective of an electrical distribution system having a load includes a sensor for sensing arc fault signatures in the presence of unwanted arc fault mimicking noise; a first load current threshold detector; a second load current threshold detector; and first and second filters for distinguishing arc fault signatures from the unwanted arc mimicking noise having first and second sets of characteristics, respectively; wherein the first filter is enabled if a load current exceeds the first load current threshold, and the second filter is enabled if the load current exceeds the second load current threshold.

According to an embodiment of the invention, an arc fault protection device protective of an electrical distribution system having a load includes means for sensing arc fault signatures in the presence of unwanted arc fault mimicking noise; a load current threshold detector; and first and second filter means for distinguishing arc fault signatures from the unwanted arc mimicking noise having first and second sets of characteristics, respectively; wherein the first filter means is enabled if a load current is below the load current threshold, and the second filter means is enabled if the load current is above the load current threshold.

According to an embodiment of the invention, an arc fault protection device protective of an electrical distribution system having a load includes means for sensing arc fault signatures in the presence of unwanted arc fault mimicking noise; a load current threshold detector, and first and second filter means for distinguishing arc fault signatures from the unwanted arc mimicking noise having first and second sets of characteristics, respectively; wherein the first filter means is enabled if a load current is below the load current threshold, and the first and second filter means are enabled if the load current is above the load current threshold.

According to an embodiment of the invention, an arc fault protection device protective of an electrical distribution system having a load includes means for sensing arc fault signatures in the presence of unwanted arc fault mimicking noise; a first load current threshold detector, a second load current threshold detector; and first and second filter means for distinguishing arc fault signatures from the unwanted arc mimicking noise having first and second sets of characteristics, respectively; wherein the first filter means is enabled if a load current exceeds the first load current threshold, and the second filter means is enabled if the load current exceeds the second load current threshold.

According to an embodiment of the invention, an arc fault protection device, protective of an electrical distribution system which includes at least first and second conductors and having a load connected across the first and second conductors, includes detecting means for detecting a di/dt signal on one of the first and second conductors; sensing means for sensing a load current of the electrical distribution system; and determining means for determining whether the di/dt signal is indicative of noise, a parallel arc fault, or a series arc fault.

According to an embodiment of the invention, a method for protecting an electrical distribution system which includes at least first and second conductors and having a load connected across the first and second conductors, includes (a) detecting a di/dt signal on one of the first and second conductors; (b) sensing a load current of the electrical distribution system; and (c) determining whether the di/dt signal is indicative of noise, a parallel arc fault, or a series arc fault.

BRIEF DESCRIPTION OF THE DRAWINGS

FIG. 1 shows a circuit which detects series and parallel arc faults and interrupts the arcing current within prescribed time allowances.

FIG. 2 shows an alternate embodiment which detects series and parallel arc faults and interrupts the arcing current with prescribed time allowances.

DETAILED DESCRIPTION OF THE PREFERRED EMBODIMENT

Arc faults have been detected on the basis of monitoring the current of the branch circuit being protected. It is important to distinguish electrical noise current caused by normal, everyday arcs such as are produced by motor brushes or the toggling of wall switches from current irregularities that otherwise constitute a true arc fault condition as previously described. The signal to noise ratio is poorer for low current A-type series arc faults compared to high current parallel B-type arcs. Since a longer period is allowed for the AFCI device to interrupt series arc faults, more time is afforded for examining the current waveform to establish that the device should trip.

Referring to FIG. 1, a circuit intended to detect series and parallel arc faults and to interrupt the arcing current within the prescribed time allowances is shown. A hot conductor 102 and a neutral conductor 100 carry current to a load 104 through normally closed interrupting contacts 106. A di/dt sensor 108 senses current to load 104, which is normally a sine wave established by the source of line voltage. Di/dt sensor 108 is preferably a toroidal transformer, with a secondary winding 110 of sensor 108 being preferably center tapped.

A first high pass filter composed of a capacitor 112 and a resistor 114 is connected to one end of secondary winding 108 and a second high pass filter composed of a resistor 112' and a capacitor 114' is connected to the other end of secondary winding 108. First and second high pass filters are chosen to block the power line frequency but pass a sharply rising di/dt signal caused by noise or arcing faults through diodes 116 or 116', whichever is forward biased, to charge a holding capacitor 118 in parallel with a bleeder resistor 120. The voltage on capacitor 118 is fed to an input 122 of a microprocessor 124.

At the same time, the load current is sensed across a resistive shunt element 126 in series with line conductor 100 as shown, or optionally in series with neutral conductor 102, low pass filtered by a resistor 127 and a capacitor 129 to strip off high frequency signals while leaving the line frequency and harmonics thereof, and amplified by an amplifier 128. If the instantaneous amplified signal exceeds a predetermined reference voltage 130, a comparator 132 produces a logic HIGH signal at an input 134 of microprocessor 124. Microprocessor 124 discerns whether the signal at input 122 is due to an arc fault condition or noise condition, determined from one set of characteristics if the signal at input 134 to microprocessor 124 is a logic LOW, and from a second set of characteristics if the signal at input 134 to microprocessor 124 is a logic HIGH. Microprocessor 124 preferably uses one software filter when the first set of characteristics is enabled and another software filter when the second set of characteristics is enabled. These software filters could also be implemented in hardware or firmware.

Various characteristics of arc faults are disclosed in U.S. patent application Ser. No. 09/735,139 filed Dec. 12, 2000 and entitled ARC FAULT DETECTOR DEVICE UTILIZING THE di/dt AND 60 HZ COMPONENTS OF AN ARCING WAVEFORM, U.S. patent application Ser. No. 09/788,206 filed Feb. 16, 2001 and entitled ARC FAULT CIRCUIT INTERRUPTER RECOGNIZING ARC NOISE BURST PATTERNS, and U.S. patent application Ser. No. 09/828,622 filed Apr. 6, 2001 and entitled AFCI DEVICE WHICH DETECTS UPSTREAM AND DOWNSTREAM SERIES AND PARALLEL ARC FAULTS, all of which are incorporated herein by reference.

When the signal at input 134 is at a logic LOW, indicative of a low arc fault current, the first set of characteristics is enabled, typically allowing pulses on capacitor 118 to be considered for a longer period of time, thereby increasing noise immunity of the circuit. When input 134 is at a logic HIGH, indicative of the rare occasions of high arc fault current, the second set of characteristics are enabled to allow microprocessor 124 to respond quickly. Once an arc fault is discerned by one set of enabled characteristics, microprocessor 124 triggers an SCR 136 to connect a solenoid 138 across hot and neutral conductors 102 and 100 to trip interrupting contacts 106, thereby disconnecting load 104 from line voltage and interrupting the arc fault current.

FIG. 2 is an alternate embodiment where electrical components 127, 128, 129, 130 and 132 bear like designations and functions to those components in the embodiment of FIG. 1. In this embodiment, however, the input of the low pass filter composed of resistor 127 in combination with capacitor 129 is connected to the same end of secondary winding 110 that the second high pass filter composed of capacitor 112' and resistor 114' is connected to. Sensor 108 provides both the functions of di/dt sensing as previously described with respect to FIG. 1, as well as load current sensing, which required resistive shunt element 126 in the embodiment of FIG. 1.

As described above, the first set of characteristics establishes if a low level arc fault is occurring, while the second set of characteristics establishes if a high level arc fault current is occurring. The sets of characteristics are preferably pre-established by microprocessor 124. Alternatively, the first set of characteristics covers the entire range of anticipated arc fault currents, approximately ranging between 5 amperes to 500 amperes as previously described, while the second set of characteristics is enabled only when arc fault currents exceed the rating of the overcurrent device protecting the branch circuit, i.e., usually ranging above approximately 30 amperes. As shown in FIG. 2, the 5 ampere threshold may be provided by an additional comparator 132' and threshold reference 130' that provides signal to microprocessor 124 input 134'.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. An arc fault protection device, protective of an electrical distribution system having a load, comprising:
   a sensor for sensing arc fault signatures in the presence of unwanted arc fault mimicking noise;
   a load current threshold detector; and
   first and second filters for distinguishing arc fault signatures from said unwanted arc mimicking noise having first and second sets of characteristics, respectively,
   wherein said first filter is enabled if a load current is below said load current threshold, and said second filter is enabled if said load current is above said load current threshold.

2. A device according to claim 1, further comprising an interrupting mechanism responsive to a signal from at least one of said first and second filters, wherein said interrupting mechanism disconnects said load from said electrical distribution system.

3. A device according to claim 1, wherein said electrical distribution system is protected by an overcurrent device having a rating, wherein said load threshold current is below said rating of said overcurrent device.

4. A device according to claim 3, wherein said overcurrent device rating is between about 15 to about 30 amperes.

5. A device according to claim 4, wherein said overcurrent device is a circuit breaker.

6. A device according to claim 4, wherein said overcurrent device is a fuse.

7. A device according to claim 1, wherein said sensor detects di/dt in said load current.

8. A device according to claim 7, wherein said sensor includes a toroidal transformer.

9. A device according to claim 8, wherein said load current threshold detector derives a signal from said toroidal transformer.

10. A device according to claim 8, wherein said load current threshold detector derives a signal from a resistive shunt in series with a hot or neutral conductor of said electrical distribution system.

11. A device according to claim 1, wherein said first and second filters are incorporated in a microprocessor.

12. An arc fault protection device, protective of an electrical distribution system having a load, comprising:
    a sensor for sensing arc fault signatures in the presence of unwanted arc fault mimicking noise;
    a load current threshold detector; and
    first and second filters for distinguishing arc fault signatures from said unwanted arc mimicking noise having first and second sets of characteristics, respectively;
    wherein said first filter is enabled if a load current is below said load current threshold, and said first and second filters are enabled if said load current is above said load current threshold.

13. A device according to claim 12, further comprising an interrupting mechanism responsive to a signal from at least one of said first and second filters, wherein said interrupting mechanism disconnects said load from said electrical distribution system.

14. A device according to claim 12, wherein said electrical distribution system is protected by an overcurrent device having a rating, wherein said load current threshold is below said rating of said overcurrent device.

15. A device according to claim 12, wherein said sensor detects di/dt in said load current.

16. A device according to claim 15, wherein said sensor includes a toroidal transformer.

17. A device according to claim 12, wherein said load current threshold detector derives a signal from a resistive shunt in series with a hot or neutral conductor of said electrical distribution system.

18. A device according to claim 12, wherein said first and second filters are incorporated in a microprocessor.

19. An arc fault protection device, protective of an electrical distribution system having a load, comprising:
    a sensor for sensing arc fault signatures in the presence of unwanted arc fault mimicking noise;
    a first load current threshold detector;
    a second load current threshold detector; and
    first and second filters for distinguishing arc fault signatures from said unwanted arc mimicking noise having first and second sets of characteristics, respectively;
    wherein said first filter is enabled if a load current exceeds said first load current threshold, and said second filter is enabled if said load current exceeds said second load current threshold and wherein said first load current threshold detector is set below said second load current threshold detector; and said first and second filters are disabled if said load current is below said first load current threshold.

20. A device according to claim 19, further comprising an interrupting mechanism responsive to a signal from at least one of said first and second filters, wherein said interrupting mechanism disconnects said load from said electrical distribution system.

21. A device according to claim 19, wherein said electrical distribution system is protected by an overcurrent device having a rating, wherein said second load current threshold is below said rating of said overcurrent device.

22. A device according to claim 19, wherein said sensor detects di/dt in said load current.

23. A device according to claim 22, wherein said sensor includes a toroidal transformer.

24. A device according to claim 19, wherein at least one of said first and second load current threshold detectors derives a signal from a resistive shunt in series with a hot or neutral conductor of said electrical distribution system.

25. A device according to claim 19, wherein said first and second filters are incorporated in a microprocessor.

26. A device according to claim 19, wherein said first load current threshold is about 5 amperes.

27. An arc fault protection device, protective of an electrical distribution system having a load, comprising:
- means for sensing arc fault signatures in the presence of unwanted arc fault mimicking noise;
- a load current threshold detector; and
- first and second filter means for distinguishing arc fault signatures from said unwanted arc mimicking noise having first and second sets of characteristics, respectively;
- wherein said first filter means is enabled if a load current is below said load current threshold, and said second filter means is enabled if said load current is above said load current threshold.

28. An arc fault protection device, protective of an electrical distribution system having a load, comprising:
- means for sensing arc fault signatures in the presence of unwanted arc fault mimicking noise;
- a load current threshold detector; and
- first and second filter means for distinguishing arc fault signatures from said unwanted arc mimicking noise having first and second sets of characteristics, respectively;
- wherein said first filter means is enabled if a load current is below said load current threshold, and said first and second filter means are enabled if said load current is above said load current threshold.

29. An arc fault protection device, protective of an electrical distribution system which includes at least first and second conductors and having a load connected across said first and second conductors, comprising:
- detecting means for detecting a di/dt signal on one of said first and second conductors;
- sensing means for sensing a load current of said electrical distribution system; and
- determining means for determining whether said di/dt signal is indicative of noise, a parallel arc fault, or a series arc fault, wherein said determining means uses a first set of characteristics to determine whether said di/dt signal is indicative of noise, a parallel arc fault, or a series arc fault and a second set of characteristics to determine whether said di/dt signal is indicative of noise or an arc fault when an arcing current exceeds a rating of an overcurrent protection device protecting said electrical distribution system.

30. A device according to claim 29, further comprising interrupting means, responsive to said determining means, for interrupting said electrical distribution system from said load when an arc fault is present.

31. A device according to claim 29, wherein said determining means uses a first set of characteristics to determine whether said di/dt signal is indicative of noise or a high level arc fault and a second set of characteristics to determine whether said di/dt signal is indicative of noise or a low level arc fault.

32. A device according to claim 31, wherein said determining means uses either said first set of characteristics or said second set of characteristics based on input received from said sensing means.

33. A device according to claim 32, wherein said sensing means includes means for comparing a magnitude of a line frequency of said electrical distribution system to a predetermined level.

34. A device according to claim 32, wherein said sensing means includes a resistive shunt sensor.

35. A device according to claim 32, wherein said sensing means includes a toroidal transformer.

36. A method for protecting an electrical distribution system which includes at least first and second conductors and having a load connected across said first and second conductors, comprising the steps of:
- detecting a di/dt signal on one of said first and second conductors;
- sensing a load current of said electrical distribution system; and
- determining whether said di/dt signal is indicative of noise, a parallel arc fault, or a series arc fault, said step of determining using a first set of characteristics to determine whether said di/dt signal is indicative of noise or a high level arc fault and a second set of characteristics to determine whether said di/dt signal is indicative of noise or a low level arc fault, whereby said step of determining uses either said first set of characteristics or said second set of characteristics based on input received from said step of sensing.

37. A method according to claim 36, further comprising the step of interrupting said electrical distribution system from said load when an arc fault is present.

38. A method according to claim 36, wherein said step of sensing includes comparing a magnitude of a line frequency of said electrical distribution system to a predetermined level.

39. A method according to claim 36, wherein said step of sensing includes connecting a resistive shunt sensor to one of said conductors.

40. A method according to claim 36, wherein said step of sensing includes connecting a toroidal transformer to one of said conductors.

41. A method according to claim 36, wherein said step of determining uses a first set of characteristics to determine whether said di/dt signal is indicative of noise, a parallel arc fault, or a series arc fault and a second set of characteristics to determine whether said di/dt signal is indicative of noise or an arc fault when an arcing current exceeds a rating of an overcurrent protection device protecting said electrical distribution system.

* * * * *